(12) United States Patent
Makowski et al.

(10) Patent No.: US 12,277,823 B2
(45) Date of Patent: Apr. 15, 2025

(54) ACCESS CONTROL TO SECURED LOCATIONS USING RELAXED BIOMETRICS

(71) Applicant: Tyco Fire & Security GmbH, Neuhausen am Rheinfall (CH)

(72) Inventors: Gregory A. Makowski, Sunnyvale, CA (US); Kshitij Judah, Sunnyvale, CA (US); Kris Duszak, Sunnyvale, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/226,603

(22) Filed: Jul. 26, 2023

(65) Prior Publication Data
US 2024/0038010 A1  Feb. 1, 2024

Related U.S. Application Data

(60) Provisional application No. 63/392,435, filed on Jul. 26, 2022.

(51) Int. Cl.
*G10L 15/08* (2006.01)
*G06F 3/01* (2006.01)
(Continued)

(52) U.S. Cl.
CPC ........... *G07C 9/27* (2020.01); *G07C 9/00563* (2013.01); *G06F 3/0227* (2013.01); *G07C 2209/02* (2013.01); *G07C 2209/14* (2013.01)

(58) Field of Classification Search
CPC ........... G07C 2209/02; G07C 2209/14; G07C 9/00563; G07C 9/27; G07C 9/37;
(Continued)

(56) References Cited

U.S. PATENT DOCUMENTS 10,360,744 B1 * 7/2019 Kerzner ............... H04N 7/185
11,128,636 B1 * 9/2021 Jorasch ............... G06F 3/0346
(Continued)

FOREIGN PATENT DOCUMENTS

CN          113158958 A      7/2021

OTHER PUBLICATIONS

International Search Report and Written Opinion in PCT/US2023/071067, mailed Oct. 25, 2023, 14 pages.

*Primary Examiner* — Dionne Pendleton
(74) *Attorney, Agent, or Firm* — ArentFox Schiff LLP

(57) ABSTRACT

Example implementations include a method, apparatus, and computer-readable medium for controlling access to a location, comprising receiving an access identifier and a biometric information sample from a user attempting to enter an access point. The implementations further include matching the access identifier to an authenticated cluster identifier corresponding to a biometric information cluster within a plurality of different biometric information clusters, wherein the biometric information cluster is associated with an authenticated user. Additionally, the implementations further include identifying, based on a machine learning model processing, a cluster identifier from the biometric information sample. Additionally, the implementations further include transmitting a first signal to allow access to the location in response to the inferred biometric information cluster identifier matching an authenticated cluster identifier, or a second signal to deny access to the location in response to the inferred biometric information cluster identifier not matching an authenticated cluster identifier.

22 Claims, 6 Drawing Sheets

(51) Int. Cl.
*G07C 9/00* (2020.01)
*G07C 9/27* (2020.01)
*G06F 3/02* (2006.01)

(58) Field of Classification Search
CPC . G07C 9/257; G07C 9/21; G07C 9/23; G07C 9/26; G07C 9/38; Y02A 90/10; H04W 12/08; H04W 12/33; H04N 23/60; H04N 23/64; H04N 23/90; H04N 7/181; H04N 7/185; H04L 63/0861; H04L 63/102; G16H 20/70; G16H 40/67; G16H 50/30; G16H 80/00; G08B 13/196; G10L 15/22; G10L 17/00; G10L 2015/225; G06V 20/10; G06V 20/20; G06V 40/10; G06V 40/172; G06V 40/197; G06T 7/70; G06Q 10/06; G06Q 10/101; G06Q 50/01; G06Q 50/163; G06Q 50/205; G06F 1/163; G06F 18/22; G06F 21/32; G06F 2203/0336; G06F 3/012; G06F 3/015; G06F 3/017; G06F 3/021; G06F 3/0346; G06F 3/03543; G06F 3/0395; A61B 2560/0242; A61B 2562/0204; A61B 2562/0219; A61B 5/0077; A61B 5/117; A61B 5/271; A61B 5/291; A61B 5/369; A61B 5/6803; A61B 5/7203; A61B 5/7405; A61B 5/749
See application file for complete search history.

(56) References Cited

U.S. PATENT DOCUMENTS

| | | | | |
|---|---|---|---|---|
| 2001/0056349 | A1* | 12/2001 | St. John | G07C 9/37 704/270 |
| 2016/0006768 | A1 | 1/2016 | Tse | |
| 2020/0118571 | A1 | 4/2020 | Huang | |

* cited by examiner

ACCESS CONTROL TO SECURED LOCATIONS USING RELAXED BIOMETRICS

CROSS-REFERENCE TO RELATED APPLICATION(S)

This application claims the priority of U.S. Provisional Application Ser. No. 63/392,435, entitled "ACCESS CONTROL TO SECURED LOCATIONS USING RELAXED BIOMETRICS" and filed on Jul. 26, 2022, which is expressly incorporated by reference herein in the entirety.

FIELD

Aspects of the present disclosure relate generally to access control and/or security systems, and more particularly, to granting or denying access to a secure location, based on collection of biometric data.

BACKGROUND

Many access control and/or security systems utilize a physical access device, such as a magnetic or radio frequency identifier (RFID) card, that can get lost, stolen, or used by a person other than the authorized individual associated with the physical access device. Other systems that use non-physical access devices, such as but not limited to systems that use biometric data, may be either slow in processing the received information and/or inaccurate in granting or denying access to a secure location.

Additionally, many biometrics based security systems currently violate personal identifiable information (PII) regulations in certain geographic regions, and therefore cannot be applied without modifications.

Accordingly, there exists a need for improvements in security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for controlling access to a location, comprising receiving an access identifier and a biometric information sample from a user attempting to enter an access point. The method further includes matching the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users. Additionally, the method further includes identifying, based on a machine learning model processing the biometric information sample, a cluster identifier of an inferred biometric information cluster within the plurality of different biometric information clusters associated with the biometric information sample. Additionally, the method further includes transmitting a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

Another example aspect includes an apparatus for controlling access to a location, comprising one or more memories and one or more processors coupled with the one or more memories. The one or more processors, individually or in combination, are configured to receive an access identifier and a biometric information sample from a user attempting to enter an access point. The one or more processors, individually or in combination, are further configured to match the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users. Additionally, the one or more processors, individually or in combination, are further configured to identify, based on a machine learning model processing the biometric information sample, a cluster identifier of an inferred biometric information cluster within the plurality of different biometric information clusters associated with the biometric information sample. Additionally, the one or more processors, individually or in combination, are further configured to transmit a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

Another example aspect includes an apparatus for controlling access to a location, comprising means for receiving an access identifier and a biometric information sample from a user attempting to enter an access point. The apparatus further includes means for matching the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users. Additionally, the apparatus further includes means for identifying, based on a machine learning model processing the biometric information sample, a cluster identifier of an inferred biometric information cluster within the plurality of different biometric information clusters associated with the biometric information sample. Additionally, the apparatus further includes means for transmitting a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

Another example aspect includes a computer-readable medium having instructions stored thereon for controlling access to a location, wherein the instructions are executable by one or more processors, individually or in combination, to receive an access identifier and a biometric information sample from a user attempting to enter an access point. The instructions are further executable to match the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users. Additionally, the instructions are further executable to identify, based on a machine learning model processing the biometric information sample, a cluster identifier of an inferred biometric information cluster within the plurality of different biometric information clusters associated with the biometric information sample. Additionally, the instructions are further executable to transmit a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Figure 1:
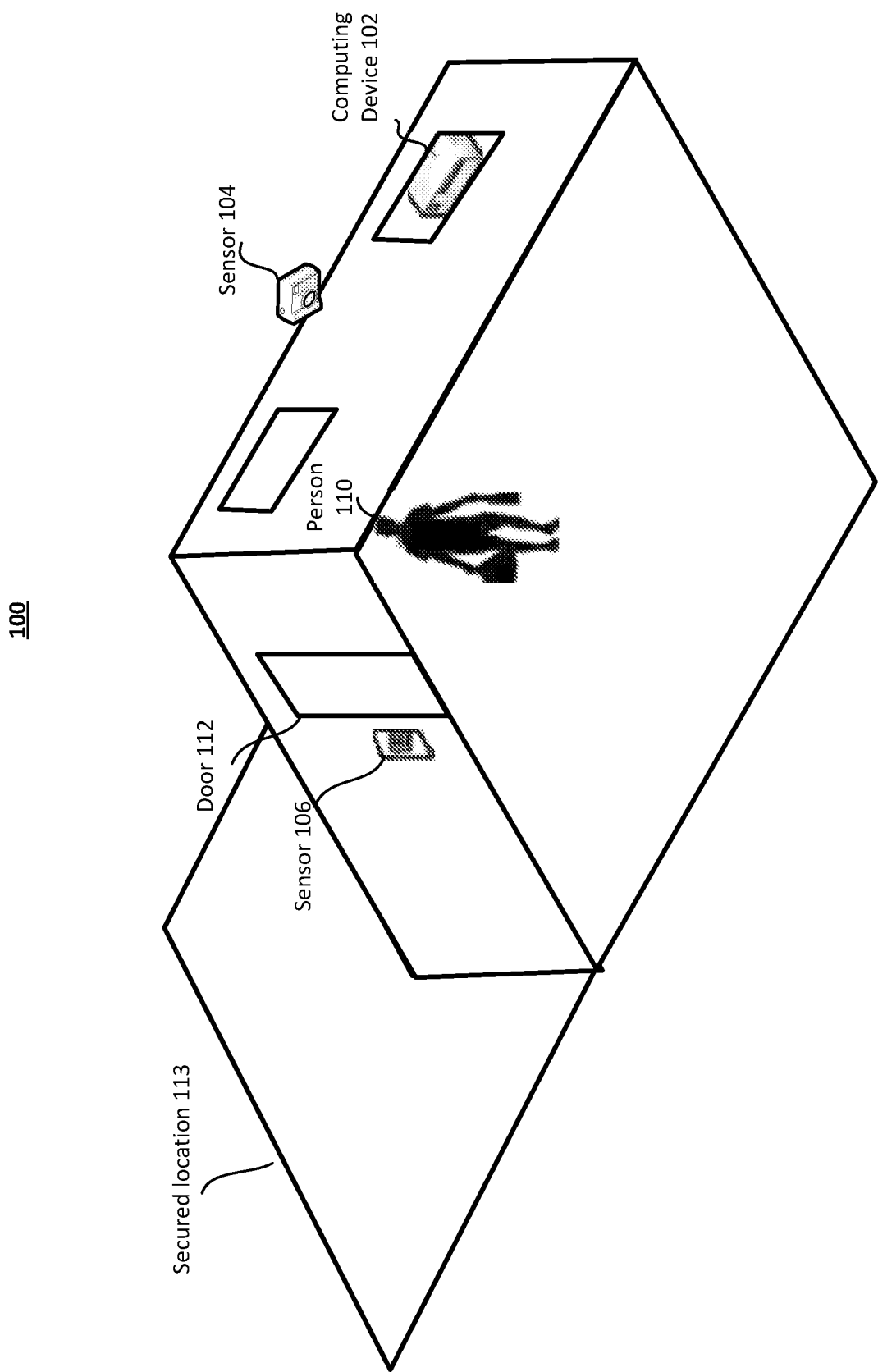
FIG. 1 is a diagram of a user attempting to enter a secure location by having his biometric information collected and processed.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide for the granting or denying of access to a secure location based, in part, on biometric data collected from a user but not uniquely saved in association with the user. For example, in an aspect, the apparatus and methods capture a biometric data sample of a user attempting to access a secure location. The biometric data sample may include, but is not limited to, facial, voice, iris, fingerprint data, and/or anthropometric measurements (such as person body height, person body width, person knee height, etc.). The biometric data sample is processed by a function, such as a machine learning model and/or a neural network, that creates embeddings or feature representations of the sample and assigns the biometric data sample a cluster identification number (cluster ID) of one of a plurality of different biometric information clusters, wherein at least one biometric information cluster is associated with an authenticated user, and wherein each biometric information cluster includes only non-unique biometric information associated with a plurality of users. Concurrently, the apparatus and methods receive an access identifier from the user, wherein the access identifier is associated with an authorized user, and may be, but is not limited to, a unique identifier associated with a physical access device (e.g., a badge or fob) and/or a personal identification number (PIN) input into a user interface by the user. The apparatus and methods identify a cluster identifier associated with the access identifier, and then determine if both cluster identifiers (e.g., the one based on the biometric data sample and the other from the access identifier) match one another. If so, then the apparatus and methods generate a signal to allow access, or, if not, then a signal to deny access or request additional information is generated.

Consequently, based on using cluster-based identification techniques that use relaxed associations and do not store unique, one-to-one user identification data, the present apparatus and methods can quickly and efficiently process received biometric data and match it to an authorized user, can avoid storing and possibly exposing unique personal identification information, and can use existing hardware so as to be quickly and efficiently implemented in existing access control systems.

In one example implementation, which should not be construed as limiting, the present apparatus and methods use voice samples. For instance, when a person gets their badge, they give a minute long speech sample to register. This initial speech sample is run through the machine learning model and is associated with one or more cluster IDs, which may also be referred to as registered or authenticated cluster IDs. Then, the unique access identifier of the badge is stored in relation to the one or more cluster identifiers obtained using the initial voice sample. Subsequently, when a person is going to use their badge, they give a short speech sample, which is processed by the same machine learning model to obtain one or more inferred cluster IDs. The one or more inferred cluster IDs are compared to the one or more authenticated cluster IDs based on the initial, authenticated sample, and access is granted or denied based on whether or not a match is found. In such implementations, to respect personally identifiable information (PII), the present apparatus and methods "cluster" or group the voice fingerprints into a predetermined number of clusters, e.g., 100 or 500. The predetermined number of clusters can be adjustably configured to adjust for "how relaxed" the PII is based on regional PII laws and/or user or customer requirements, wherein an increase in the number of clusters corresponds to an increase in the uniqueness of the personal information in the cluster. As such, people in the same cluster are admitted. More clusters are more unique. In any case, at the door, after the person swipes their badge, the apparatus and methods use the badge ID (e.g., access identifier) to get one or more cluster IDs, and if the registration cluster ID is the same as the door cluster ID, then the apparatus and methods open the door, whereas the door remains closed if the cluster IDs do not match.

Referring to FIG. 1, an example access control system 100 includes a computing device 102 configured to implement a biometric data cluster-based identification of a person (or user) 110 to authorize or deny access through an access point 112, such as but not limited to a door, to a secured location 113. Biometric sensor 104 will collect a biometric sample from person 110 for use in associating the biometric sample with a non-unique set of information associated with a cluster of persons. The biometric sensor 104 may be any one or any combination of sensors configured to collect or receive any type or combination of biometric data, such as, but not limited to, facial, iris, voice, fingerprint data, and/or anthropometric measurements (such as person body height, person body width, person knee height, etc.), from the person 110. Additionally, access control system 100 includes a non-biometric sensor 106 configured to obtain a unique identifier associated with an authenticated access permission from the person 110. For instance, the unique identifier may be associated with an authorized physical access device (e.g., a badge or fob) and/or an authorized personal identification number (PIN) that is input into the non-biometric sensor 106 by the person 110. For example, the non-biometric sensor 106 may include, but is not limited to, a card reader (e.g., magnetic or wireless) and/or a physical or virtual keypad.

Biometric sensor 104 and non-biometric sensor 106 then transmit the collected data to computing device 102, where computing device 102 separately determines a cluster identifier associated with the unique identifier and a cluster identifier associated with the biometric sample and determines if they match. If so, then the computing device 102 generates a signal that is transmitted to the access point 112 to allow access. In contrast, if there is no match, then the computing device 102 generates a signal that is transmitted to the access point 112 to deny access, or to request additional information.

In particular, for the unique identifier, computing device 102 performs a look-up in a table or relational database to identify a cluster identifier associated with the unique identifier. As noted above, the cluster identifier corresponds to one of a plurality of different biometric information clusters within a plurality of persons, wherein at least one biometric information cluster is associated with an authenticated user, and wherein each biometric information cluster includes only non-unique biometric information associated with the plurality of persons. In other words, non-person-specific sets of biometric information define each biometric cluster, and one or more of the plurality of biometric clusters is associated with a user authorized to access the secured location 113. In this case, the unique identifier is associated with an authorized user who is permitted to access the secured location 113, and based on the apparatus and methods described herein, the unique identifier is associated with a cluster identifier of a biometric information cluster associated with previously-collected and authorized biometric information of the authorized user. As noted herein, the biometric information cluster contain non-unique user information, e.g., biometric information that is not one-to-one tied to a specific authorized user. This feature of the described aspects allows for quick and efficient processing of a biometric information data sample while avoiding the storage and transfer of personally identifiable information. In some aspects, for example, the non-unique biometric information may include, but is not limited to, facial (e.g., round, oval, etc.), voice (e.g., male, female, etc.), iris (e.g., green, blue, brown, etc.), anthropometric measurements (such as person body height, person body width, person knee height, etc.)."

Concurrently with the above-noted processing of the unique identifier, computing device 102 applies an algorithm or function, such as a machine learning model and/or a neural network trained to associate biometric information with one of the plurality of biometric information clusters, to the biometric data sample and identifies a sample cluster ID associated with one of the plurality of different biometric information clusters, and then compares the sample cluster ID with cluster ID corresponding to the unique identifier of the authorized user. If there is a match, the computing device 102 will transmit a signal to door 112 to open. If not, the computing device 102 will transmit a signal to door 112 to remain closed and/or to request more information. For instance, in an aspect, the computing device 102 may request that the person 110 submit one or more additional biometric information samples, either of a same type or a different type as the original biometric sample, and/or submit additional identifying information and/or authorization information. In this case, the computing device 102 may utilize any/all of this additional information to further determine a sample cluster ID to associate with the person 110 in order to determine whether or not to allow access to the secure location 113.

Figure 2:
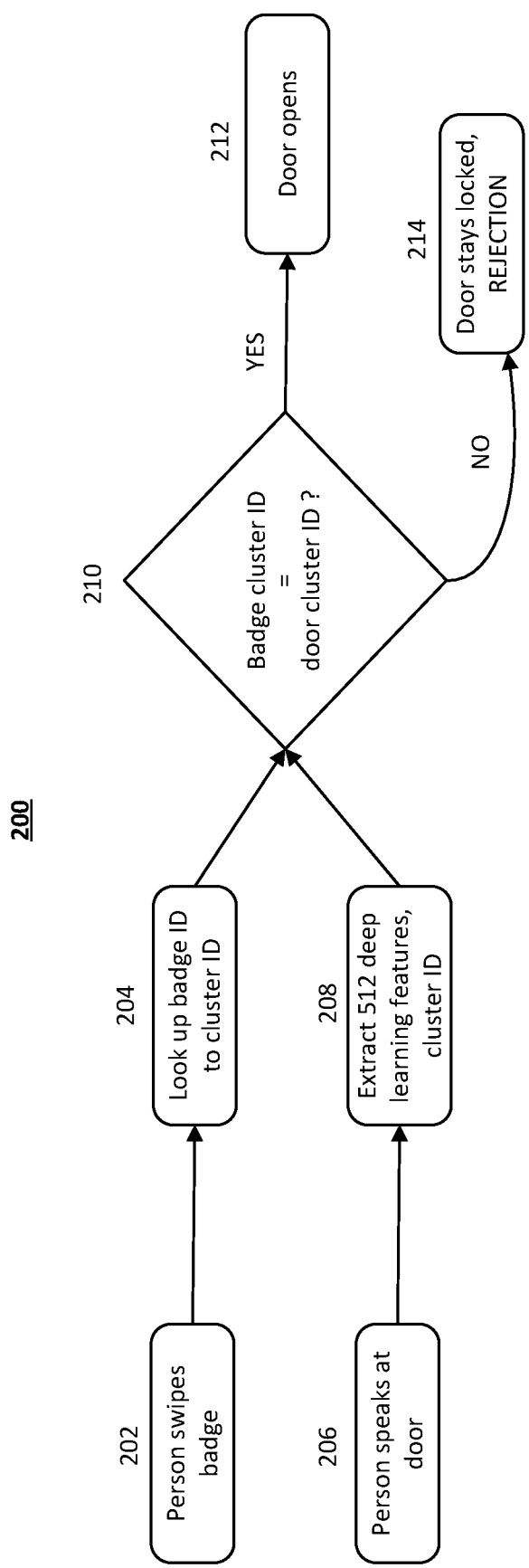
FIG. 2 is a flowchart of an example aspect of access control described herein, in which a user uses a physical access device, such as a badge, as a first mechanism of authentication, and the user uses a biometric information, such as but not limited to voice, as the second mechanism of authentication.
Figure 3:
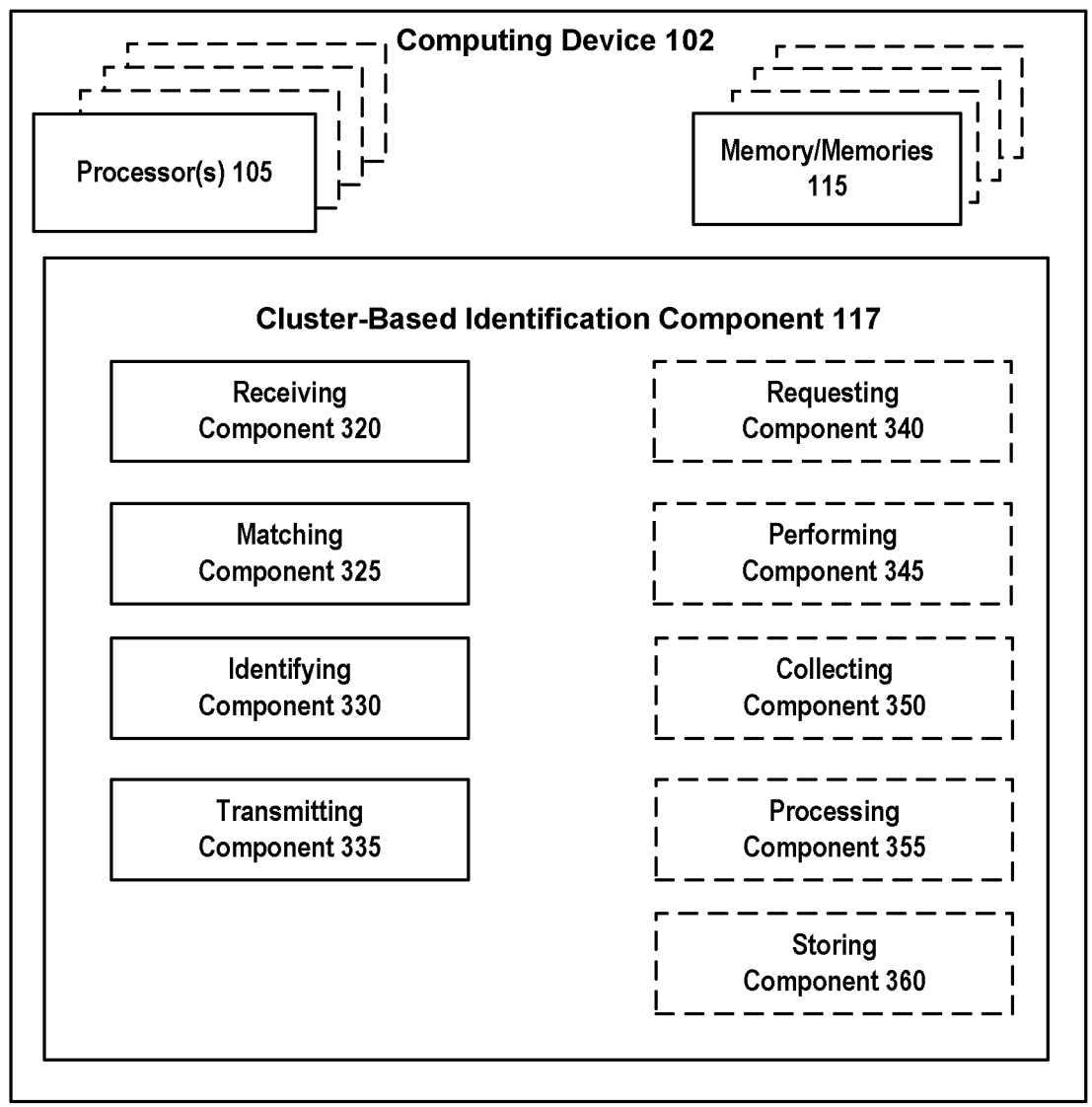
FIG. 3 is a block diagram of an example of a computing device having components configured to perform a method for controlling access to a location.
Figure 4:
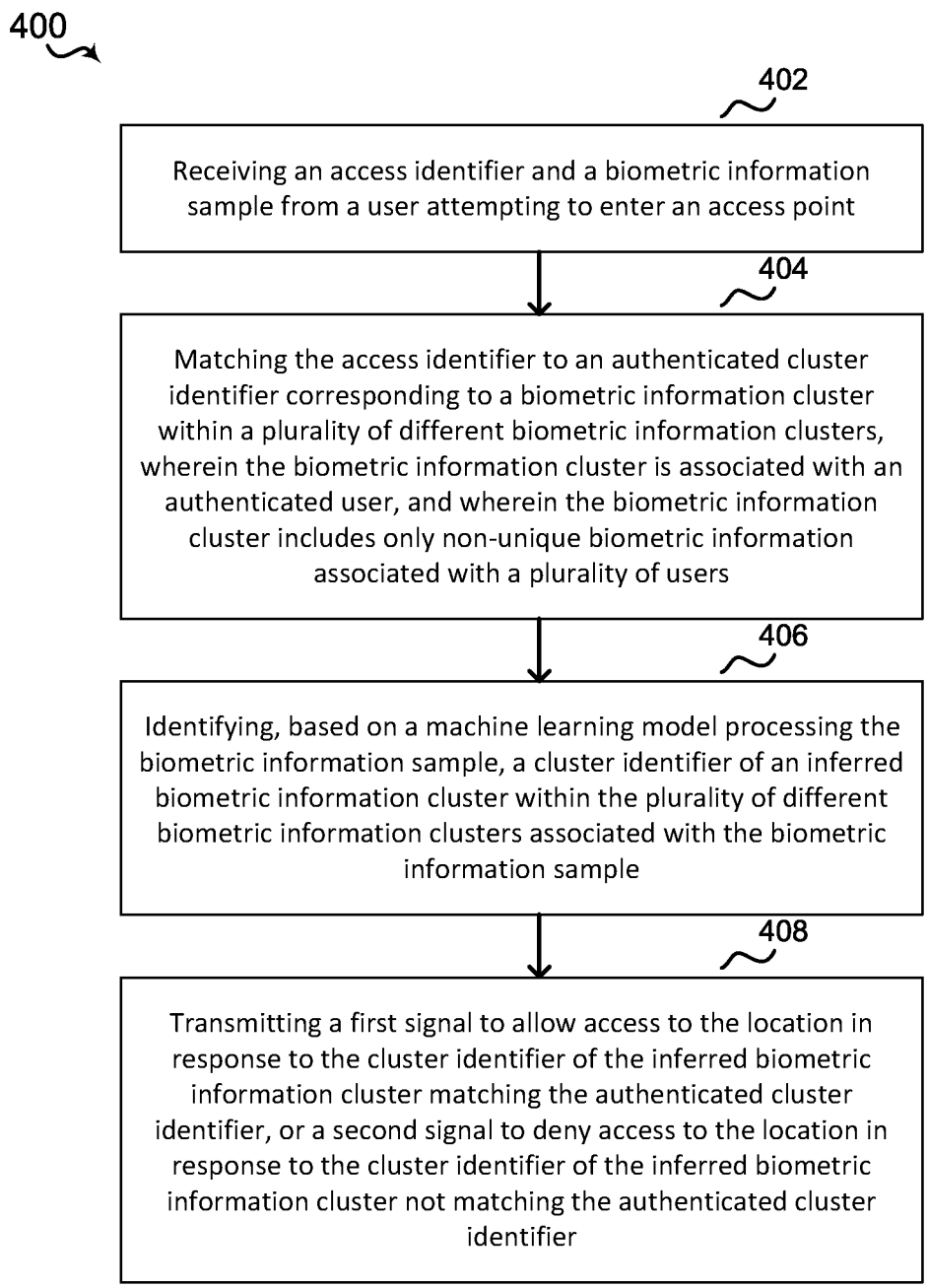
FIG. 4 is a flowchart of an example of a method for controlling access to a location.

Referring now to FIG. 2, one example of a method 200 for controlling access to a secure location includes, at action 202, the person using an employee badge as a first form of authentication. For example, a card reader at an access point, such as a controllable locked/unlocked door to a secure location, may read the employee badge and obtain a unique identifier that the computing device associates with access authentications to one or more secure locations. At action 204, the unique identifier associated with the employee badge is mapped or otherwise tracked to one or more authorized cluster IDs of the plurality of biometric information clusters associated with the person based on the unique identifier from the badge. Concurrently, at action 206, the person then speaks at the access point, e.g., provides a speech voice sample to a user interface, and the voice sample is collected. At action 208, this voice sample is 1) processed using one or more algorithms, functions, and/or machine leaning models, such as but not limited to deep learning features in a neutral network, and 2) the voice sample is assigned, based on features such as, but not limited to, deep learning features in a Neural Network, one or more sample cluster IDs. At action 210, if the one or more sample cluster IDs match at least one of the one or more authorized cluster IDs generated from the badge, then, at action 212, an access granted signal is generated and the door will open. Otherwise, at action 214, an access denied signal is generated and the door will remain locked. In other words, the apparatus and methods herein associate a biometric sample with one or more of a plurality of different biometric clusters, each associated with a set of non-unique biometric information, and allow access to a secure location if the biometric information cluster associated with the biometric sample matches with an authenticated biometric information cluster associated with an authenticated unique identifier of another non-biometric access device of an authenticated user.

Referring to FIGS. 3-6, in operation, computing device 102 may perform a method 400 of wireless communication, such as via execution of cluster-based identification component 117 by one or more processors 105, individually or in combination, and/or one or more memories 115.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

At block 402, the method 400 includes receiving an access identifier and a biometric information sample from a user attempting to enter an access point. For example, in an aspect, computing device 102, one or more processors 105, one or more memories 115, cluster-based identification component 117, and/or receiving component 320 may be configured to or may comprise means for receiving an access identifier and a biometric information sample from a user attempting to enter an access point.

For example, the receiving at block 402 may include reading an employee badge to obtain an access identifier, and obtaining facial, iris, voice, fingerprint data, and/or anthropometric measurements (such as person body height, person body width, person knee height, etc.) as biometric information.

Further, for example, the receiving at block 402 may include receiving multiple types of biometric information, which further increases the probability that the access point blocks unauthorized users. For instance, if each of three different types of biometrics produce a 1 in 100 chance of an incorrect identification, then combining the three different types of biometric information to identify a person results in a 1 in 1,000,000 chance of an incorrect identification (e.g., (1/100)*(1/100)*(1/100)=1/1,000,000).

At block 404, the method 400 includes matching the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users. For example, in an aspect, computing device 102, one or more processors 105, one or more memories 115, cluster-based identification component 117, and/or matching component 325 may be configured to or may comprise means for matching the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users.

For example, the matching at block 404 may include correlating the received access identifier with one or more authenticated biometric cluster IDs associated with an authenticated user based on the access identifier. In this case, an authenticated biometric information sample is previously-obtained from the authenticated user, and the one or more algorithms, functions, and/or machine leaning models, such as but not limited to deep learning features in a neutral network, associate this authenticated biometric information sample to one or more cluster IDs of one or more biometric information clusters associated with a plurality of persons. For instance, in the case of using voice samples as the biometric information, the machine learning model may be any type of speaker identification model. Utilizing speech as the biometric information may have one or more advantages, such as being language independent, requiring less processing resources to analyze voice information as compared to visual information, and hence being less expensive to deploy, and also being more difficult to spoof as an attacker would not be able to easily imitate the voice of another person because of voice box and mouth structure differences. Moreover, the clustering techniques described herein can be used with any type of biometric information, and/or as noted above, combinations of different types of biometric information can improve the accuracy of the identification. Consequently, the access identifier is related to one or more authenticated cluster IDs.

At block 406, the method 400 includes identifying, based on a machine learning model processing the biometric information sample, a cluster identifier of an inferred biometric information cluster within the plurality of different biometric information clusters associated with the biometric information sample. For example, in an aspect, computing device 102, one or more processors 105, one or more memories 115, cluster-based identification component 117, and/or identifying component 330 may be configured to or may comprise means for identifying, based on machine learning model processing the biometric information sample, a cluster identifier of an inferred biometric information cluster within the plurality of different biometric information clusters associated with the biometric information sample.

For example, the identifying at block 406 may include processing the biometric sample via the one or more algorithms, functions, and/or machine leaning models, such as but not limited to a neutral net and/or a Deep Learning model that associates one or more biometric information clusters with a plurality of persons to obtain one or more inferred cluster IDs.

At block 408, the method 400 includes transmitting a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier. For example, in an aspect, computing device 102, one or more processors 105, one or more memories 115, cluster-based identification component 117, and/or transmitting component 335 may be configured to or may comprise means for transmitting a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

For instance, as noted herein, the inferred biometric information cluster identifier and the authenticated cluster identifier are compared, and allowing or denying access is based on whether the two identifiers match.

In an alternative or additional aspect, the machine learning model is a person identification model, and the non-unique biometric information associated with the plurality of users comprises a first set of information at an intermediate layer of the person identification model prior to a second set of information that uniquely identifies the user in a final layer of the person identification model.

In an alternative or additional aspect, a number of the plurality of different biometric information clusters is configured based on a personal identification information restriction level.

In an alternative or additional aspect, a number of the plurality of different biometric information clusters is configured based on a confidence threshold.

In an alternative or additional aspect, a number of the plurality of different biometric information clusters is configured based on a personal identification information restriction level and a confidence threshold.

In an alternative or additional aspect, the biometric information sample comprises a voice sample, and wherein the machine learning model comprises a speaker recognition model.

In an alternative or additional aspect, the biometric information sample comprises a plurality of different types of biometric information from the user, and wherein identifying the cluster identifier of the inferred biometric information cluster within the plurality of different biometric information clusters comprises processing each of the plurality of different types of biometric information with a type-specific one of a plurality of different types of machine learning models. In this aspect, at least two of the plurality of different biometric information clusters have different confidence thresholds.

Figure 5:
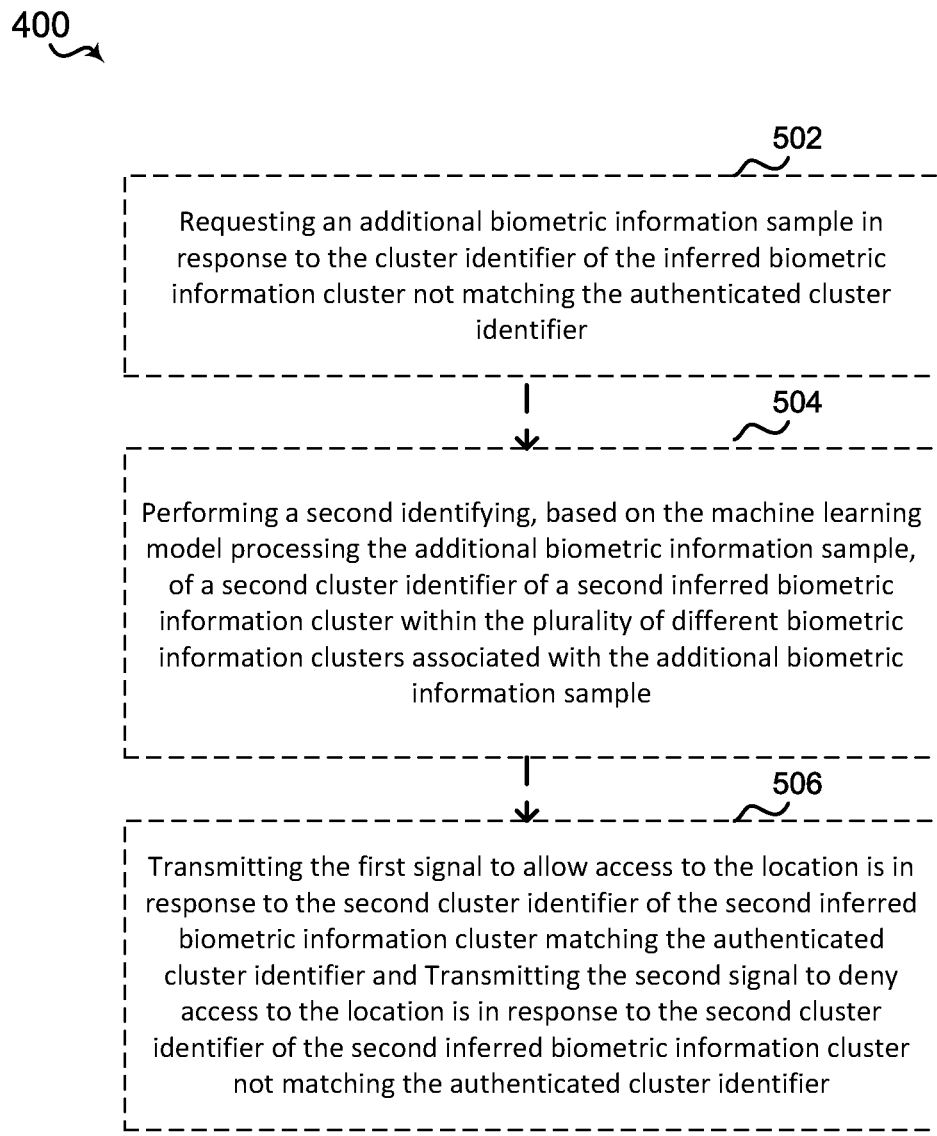
FIG. 5 is a flowchart of additional example aspects of the method of FIG. 4.

Referring to FIG. 5, in an alternative or additional aspect, at block 502, the method 400 may further include requesting an additional biometric information sample in response to the inferred biometric information cluster identifier not matching the authenticated cluster identifier. For example, in an aspect, computing device 102, one or more processors 105, one or more memories 115, cluster-based identification component 117, and/or requesting component 340 may be configured to or may comprise means for requesting an additional biometric information sample in response to the inferred biometric information cluster identifier not matching the authenticated cluster identifier.

For example, the requesting at block 502 may include requesting additional samples of a same type of biometric information, and/or additional samples of other types of biometric information, including, but not limited to, facial, iris, voice, fingerprint data, and/or anthropometric measurements (such as person body height, person body width, person knee height, etc.).

In this optional aspect, at block 504, the method 400 may further include performing a second identifying, based on the machine learning model processing the additional biometric information sample, of a second cluster identifier of a second inferred biometric information cluster within the plurality of different biometric information clusters associated with the additional biometric information sample. For example, in an aspect, computing device 102, one or more processors 105, one or more memories 115, cluster-based identification component 117, and/or performing component 345 may be configured to or may comprise means for performing a second identifying, based on the machine learning model processing the additional biometric information sample, of a second cluster identifier of a second inferred biometric information cluster within the plurality of different biometric information clusters associated with the additional biometric information sample.

For example, the performing at block 504 may include processing the biometric sample as described above to obtain one or more cluster identifiers.

In this optional aspect, at block 508, the method 400 may further include transmitting the first signal to allow access to the location in response to the second cluster identifier of the second inferred biometric information cluster matching the authenticated cluster identifier; and transmitting the second signal to deny access to the location in response to the second inferred biometric information cluster identifier not matching the authenticated cluster identifier. For example, in an aspect, computing device 102, one or more processors 105, one or more memories 115, cluster-based identification component 117, and/or transmitting component 335 may be configured to or may comprise means for transmitting the first signal to allow access to the location in response to the second cluster identifier of the second inferred biometric information cluster matching the authenticated cluster identifier; and transmitting the second signal to deny access to the location in response to the second inferred biometric information cluster identifier not matching the authenticated cluster identifier.

For instance, as noted herein, the second inferred biometric information cluster identifier and the authenticated cluster identifier are compared, and allowing or denying access is based on whether the two identifiers match.

In an alternative or additional aspect, the additional biometric sample is a different type of biometric information than the biometric information sample.

Figure 6:
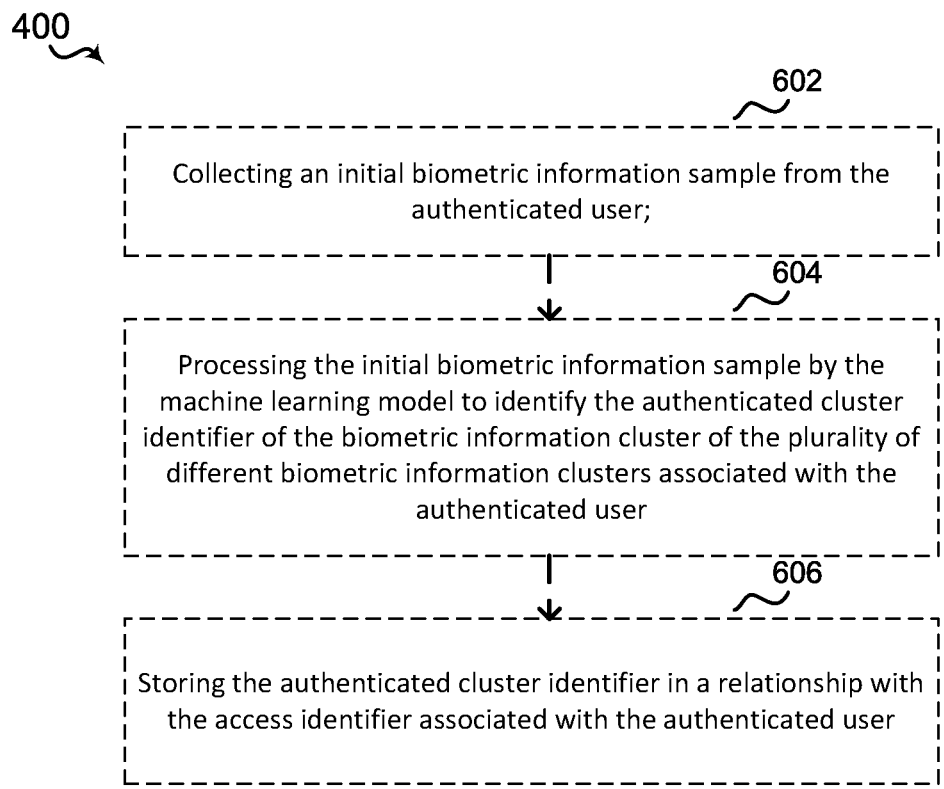
FIG. 6 is a flowchart of additional example aspects of the method of FIG. 4.

Referring to FIG. 6, in an alternative or additional aspect, at block 602, the method 400 may further include collecting an initial biometric information sample from the authenticated user. For example, in an aspect, computing device 102, one or more processors 105, one or more memories 115, cluster-based identification component 117, and/or collecting component 350 may be configured to or may comprise means for collecting an initial biometric information sample from the authenticated user.

For example, the collecting at block 602 may include collecting facial, iris, voice, and/or fingerprint data from an authenticated user.

In this optional aspect, at block 604, the method 400 may further include processing the initial biometric information sample by the machine learning model to identify the authenticated cluster identifier of the biometric information cluster within the plurality of different biometric information clusters associated with the authenticated user. For example, in an aspect, computing device 102, one or more processors 105, one or more memories 115, cluster-based identification component 117, and/or processing component 355 may be configured to or may comprise means for processing the initial biometric information sample by the machine learning model to identify the authenticated cluster identifier of the biometric information cluster within the plurality of different biometric information clusters associated with the authenticated user.

For example, the processing at block 604 may include processing the biometric sample as described above to obtain one or more cluster identifiers.

In this optional aspect, at block 606, the method 400 may further include storing the authenticated cluster identifier in a relationship with the access identifier associated with the authenticated user. For example, in an aspect, computing device 102, one or more processors 105, one or more memories 115, cluster-based identification component 117, and/or storing component 360 may be configured to or may comprise means for storing the authenticated cluster identifier in a relationship with the access identifier associated with the authenticated user.

For example, the storing at block 606 may include storing the biometric information within the hard drive of computing device 102.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling access to a location, comprising:
    receiving an access identifier and a biometric information sample from a user attempting to enter an access point;
    matching the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users;
    identifying, based on a machine learning model processing the biometric information sample, a cluster identifier of an inferred biometric information cluster within the plurality of different biometric information clusters associated with the biometric information sample; and
    transmitting a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

2. The method of claim 1, wherein the machine learning model is a person identification model, and wherein the non-unique biometric information associated with the plurality of users comprises a first set of information at an intermediate layer of the person identification model prior to a second set of information that uniquely identifies the user in a final layer of the person identification model.

3. The method of claim 1, wherein a number of the plurality of different biometric information clusters is configured based on a personal identification information restriction level.

4. The method of claim 1, wherein a number of the plurality of different biometric information clusters is configured based on a confidence threshold.

5. The method of claim 1, wherein a number of the plurality of different biometric information clusters is configured based on a personal identification information restriction level and a confidence threshold.

6. The method of claim 1, wherein the biometric information sample comprises a voice sample, and wherein the machine learning model comprises a speaker recognition model.

7. The method of claim 1, wherein the biometric information sample comprises a plurality of different types of biometric information from the user, and wherein identifying the cluster identifier of the inferred biometric information cluster within the plurality of different biometric information clusters comprises processing each of the plurality of different types of biometric information with a type-specific one of a plurality of different types of machine learning models.

8. The method of claim 7, wherein at least two of the plurality of different biometric information clusters have different confidence thresholds.

9. The method of claim 1, further comprising:
   requesting an additional biometric information sample in response to the cluster identifier of the inferred biometric information cluster not matching the authenticated cluster identifier;
   performing a second identifying, based on the machine learning model processing the additional biometric information sample, of a second cluster identifier of a second inferred biometric information cluster within the plurality of different biometric information clusters associated with the additional biometric information sample;
   wherein transmitting the first signal to allow access to the location is in response to the second cluster identifier of the second inferred biometric information cluster matching the authenticated cluster identifier; and
   wherein transmitting the second signal to deny access to the location is in response to the second cluster identifier of the second inferred biometric information cluster not matching the authenticated cluster identifier.

10. The method of claim 9, wherein the additional biometric information sample is a different type of biometric information than the biometric information sample.

11. The method of claim 1, further comprising:
   collecting an initial biometric information sample from the authenticated user;
   processing the initial biometric information sample by the machine learning model to identify the authenticated cluster identifier of the biometric information cluster within the plurality of different biometric information clusters associated with the authenticated user; and
   storing the authenticated cluster identifier in a relationship with the access identifier associated with the authenticated user.

12. An apparatus for controlling access to a location, comprising:
   one or more memories; and
   one or more processors communicatively coupled with the one or more memories and, individually or in combination, configured to:
      receive an access identifier and a biometric information sample from a user attempting to enter an access point;
      match the access identifier to an authenticated cluster identifier corresponding to a biometric information cluster within a plurality of different biometric information clusters, wherein the biometric information cluster is associated with an authenticated user, and wherein the biometric information cluster includes only non-unique biometric information associated with a plurality of users;
      identify, based on machine learning model processing the biometric information sample, a cluster identifier of an inferred biometric information cluster within the plurality of different biometric information clusters associated with the biometric information sample; and
      transmit a first signal to allow access to the location in response to the cluster identifier of the inferred biometric information cluster matching the authenticated cluster identifier, or a second signal to deny access to the location in response to the cluster identifier of the inferred biometric information cluster not matching the authenticated cluster identifier.

13. The apparatus of claim 12, wherein the machine learning model is a person identification model, and wherein the non-unique biometric information associated with the plurality of users comprises a first set of information at an intermediate layer of the person identification model prior to a second set of information that uniquely identifies the user in a final layer of the person identification model.

14. The apparatus of claim 12, wherein a number of the plurality of different biometric information clusters is configured based on a personal identification information restriction level.

15. The apparatus of claim 12, wherein a number of the plurality of different biometric information clusters is configured based on a confidence threshold.

16. The apparatus of claim 12, wherein a number of the plurality of different biometric information clusters is configured based on a personal identification information restriction level and a confidence threshold.

17. The apparatus of claim 12, wherein the biometric information sample comprises a voice sample, and wherein the machine learning model comprises a speaker recognition model.

18. The apparatus of claim 12, wherein the biometric information sample comprises a plurality of different types of biometric information from the user, and wherein to identify the cluster identifier of the inferred biometric information cluster within the plurality of different biometric information clusters comprises processing each of the plurality of different types of biometric information with a type-specific one of a plurality of different types of machine learning models.

19. The apparatus of claim 18, wherein at least two of the plurality of different biometric information clusters have different confidence thresholds.

20. The apparatus of claim 12, wherein the one or more processors are further configured to:
   request an additional biometric information sample in response to the cluster identifier of the inferred biometric information cluster not matching the authenticated cluster identifier;
   perform a second identifying, based on the machine learning model processing the additional biometric information sample, of a second cluster identifier of a second inferred biometric information cluster within the plurality of different biometric information clusters associated with the additional biometric information sample;
   wherein to transmit the first signal to allow access to the location is in response to the second cluster identifier of the second inferred biometric information cluster matching the authenticated cluster identifier; and
   wherein to transmit the second signal to deny access to the location is in response to the second cluster identifier of the second inferred biometric information cluster not matching the authenticated cluster identifier.

21. The apparatus of claim 20, wherein the additional biometric information sample is a different type of biometric information than the biometric information sample.

22. The apparatus of claim 12, wherein the one or more processors are further configured to:
   collect an initial biometric information sample from the authenticated user;
   process the initial biometric information sample by the machine learning model to identify the authenticated cluster identifier of the biometric information cluster within the plurality of different biometric information clusters associated with the authenticated user; and store the authenticated cluster identifier in a relationship with the access identifier associated with the authenticated user.

\* \* \* \* \*